(12) United States Patent
Isenhour et al.

(10) Patent No.: US 9,568,678 B2
(45) Date of Patent: Feb. 14, 2017

(54) LENS BLOCK FOR OPTICAL CONNECTION

(71) Applicant: Corning Cable Systems LLC, Hickory, NC (US)

(72) Inventors: Micah Colen Isenhour, Lincolnton, NC (US); Dennis Michael Knecht, Hickory, NC (US); James Phillip Luther, Hickory, NC (US)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 0 days.

(21) Appl. No.: 14/099,916

(22) Filed: Dec. 7, 2013

(65) Prior Publication Data

US 2014/0112627 A1   Apr. 24, 2014

Related U.S. Application Data

(63) Continuation of application No. PCT/US2013/065815, filed on Oct. 21, 2013.

(Continued)

(51) Int. Cl.
*G02B 6/32* (2006.01)
*G02B 6/42* (2006.01)
*G02B 6/38* (2006.01)

(52) U.S. Cl.
CPC .............. *G02B 6/32* (2013.01); *G02B 6/4204* (2013.01); *G02B 6/4214* (2013.01);
(Continued)

(58) Field of Classification Search
CPC ......... G02B 6/32; G02B 6/322; G02B 6/3886; G02B 6/4204; G02B 6/4214; G02B 6/4249; G02B 6/4292; G02B 6/4293; Y10T 29/49826; Y10T 29/49117
(Continued)

(56) References Cited

U.S. PATENT DOCUMENTS 4,844,582 A * 7/1989 Giannini ...................... 385/57
6,085,016 A   7/2000 Espindola et al. ............ 385/140
(Continued)

FOREIGN PATENT DOCUMENTS

DE   102005050274 A1   4/2007 ............... G02B 6/32
EP        2453281 A1   5/2012
(Continued)

OTHER PUBLICATIONS

Patent Cooperation Treaty, International Search Report and Written Opinion for International Application No. PCT/US2013/065815; Mailing Date Jan. 31, 2014—9 pages.

(Continued)

*Primary Examiner* — Peter Radkowski

(57) ABSTRACT

Disclosed are lens blocks and methods for making the same. In one embodiment, the lens block includes at least one optical channel having an optical interface portion on a first side, and one or more magnetic materials attached to the lens block. In one embodiment, the lens block may include one or more opening for receiving the one or more magnetic materials. The one or more openings may be located on any suitable side of the lens block as desired. The magnetic materials provide attachment with a complimentary device having an optical interface. Consequently, the lens block allows for quick and easy assembly along with a robust structure for a large number of mating/unmating cycles. In other embodiments, the lens blocks disclosed may further include one or more electrical contacts for making a hybrid connection.

29 Claims, 9 Drawing Sheets

Related U.S. Application Data

(60) Provisional application No. 61/718,030, filed on Oct. 24, 2012.

(52) U.S. Cl.
CPC ............ *G02B 6/4292* (2013.01); *G02B 6/322* (2013.01); *G02B 6/3886* (2013.01); *G02B 6/4249* (2013.01); *G02B 6/4293* (2013.01); *Y10T 29/49117* (2015.01); *Y10T 29/49826* (2015.01)

(58) Field of Classification Search
USPC .................................. 385/53, 88; 29/428, 825
See application file for complete search history.

(56) References Cited

U.S. PATENT DOCUMENTS

| | | | |
|---|---|---|---|
| 6,896,421 B2 * | 5/2005 | Monson et al. ................. 385/89 |
| 7,361,045 B1 * | 4/2008 | Vinciguerra ........... H01R 13/20 |
| | | | 439/346 |
| 7,517,222 B2 * | 4/2009 | Rohrbach .......... H01R 13/6205 |
| | | | 439/39 |
| 7,566,224 B2 | 7/2009 | Wu |
| 7,641,477 B2 | 1/2010 | DiFonzo et al. ................. 439/39 |
| 7,645,143 B2 * | 1/2010 | Rohrbach .......... H01R 13/6205 |
| | | | 439/218 |
| 7,755,462 B2 * | 7/2010 | Fullerton et al. ............. 335/306 |
| 7,817,005 B2 * | 10/2010 | Fullerton et al. ............. 335/306 |
| 7,817,006 B2 * | 10/2010 | Fullerton et al. ............. 335/306 |
| 7,874,844 B1 * | 1/2011 | Fitts, Jr. ............. H01R 13/6205 |
| | | | 439/218 |
| 7,901,216 B2 * | 3/2011 | Rohrbach .......... H01R 13/6205 |
| | | | 439/39 |
| 8,087,939 B2 * | 1/2012 | Rohrbach .......... H01R 13/6205 |
| | | | 439/39 |
| 8,138,869 B1 | 3/2012 | Lauder et al. ................. 335/219 |
| 8,143,982 B1 | 3/2012 | Lauder et al. ................. 335/219 |
| 8,143,983 B1 | 3/2012 | Lauder et al. ................. 335/219 |
| 8,177,560 B2 * | 5/2012 | Rohrbach .......... H01R 13/6205 |
| | | | 439/39 |
| 8,180,093 B2 | 5/2012 | Hankey et al. ................. 381/374 |
| 8,185,084 B2 | 5/2012 | Terlizzi ...................... 455/343.5 |
| 8,242,868 B2 | 8/2012 | Lauder et al. ................. 335/219 |
| 8,315,492 B2 * | 11/2012 | Chen et al. ...................... 385/33 |
| 8,405,346 B2 * | 3/2013 | Trigiani .............. B60L 11/1816 |
| | | | 320/108 |
| 8,774,577 B2 | 7/2014 | Benjamin et al. |
| 8,781,273 B2 | 7/2014 | Benjamin et al. |
| 8,814,442 B2 * | 8/2014 | Chen ............................... 385/54 |
| 8,882,368 B2 * | 11/2014 | Hayashi ............... G02B 6/4206 |
| | | | 385/31 |
| 9,164,246 B2 | 10/2015 | Isenhour et al. |
| 2003/0117623 A1 | 6/2003 | Tokhtuev et al. ............. 356/338 |
| 2004/0165836 A1 | 8/2004 | Monson et al. ................. 385/89 |
| 2007/0077810 A1 * | 4/2007 | Gogel ..................... H01R 13/60 |
| | | | 439/505 |
| 2007/0122079 A1 * | 5/2007 | Drabarek et al. ................. 385/39 |
| 2008/0096398 A1 * | 4/2008 | Rohrbach .......... H01R 13/6205 |
| | | | 439/39 |
| 2010/0080563 A1 * | 4/2010 | DiFonzo et al. ............. 398/115 |
| 2010/0207771 A1 * | 8/2010 | Trigiani .............. B60L 11/1816 |
| | | | 340/636.1 |
| 2010/0272403 A1 * | 10/2010 | Chen et al. ...................... 385/93 |
| 2011/0091181 A1 * | 4/2011 | DeMeritt et al. ............. 385/140 |
| 2012/0028480 A1 * | 2/2012 | Bilbrey .............. H01R 13/6205 |
| | | | 439/39 |
| 2012/0082417 A1 | 4/2012 | Stanley et al. ................... 385/77 |
| 2012/0155803 A1 * | 6/2012 | Benjamin et al. ............. 385/33 |
| 2012/0170886 A1 * | 7/2012 | Yu et al. ......................... 385/14 |
| 2012/0177323 A1 * | 7/2012 | Schwandt ............. G02B 6/4292 |
| | | | 385/57 |
| 2012/0189248 A1 * | 7/2012 | Hsu .................................. 385/33 |
| 2012/0224817 A1 * | 9/2012 | Hayashi ............... G02B 6/4206 |
| | | | 385/93 |
| 2013/0236139 A1 * | 9/2013 | Chen .................... G02B 6/3878 |
| | | | 385/60 |

FOREIGN PATENT DOCUMENTS

| | | | | |
|---|---|---|---|---|
| JP | 2002-311297 A | | 10/2002 | ............ G02B 6/38 |
| JP | 2005352362 A | * | 12/2005 | |
| JP | 2008224954 A | * | 9/2008 | |
| JP | 2010122311 A | * | 6/2010 | |
| JP | 2010122312 A | * | 6/2010 | |
| JP | 2010122312 A | | 6/2010 | |
| WO | WO 2010/036956 A1 | | 4/2010 | |

OTHER PUBLICATIONS

Communication Pursuant to Rules 161(1) and 162 EPC issued in corresponding EP Application No. 13785758.7 on Jun. 19, 2015.
Chinese First Search Report CN201380060474.9 Dated Sep. 23, 2016.

* cited by examiner

LENS BLOCK FOR OPTICAL CONNECTION

PRIORITY

This application is a continuation of International Application No. PCT/US13/65815 filed Oct. 21, 2013, which claims the benefit of priority to U.S. Application No. 61/718,030 filed Oct. 24, 2012, both applications being incorporated herein by reference.

FIELD

The disclosure is directed to a lens block for an optical connection for use in cable assemblies, electronic devices and the like. More specifically, the disclosure is directed to lens blocks having at least one optical channel and one or more magnet materials attached to the lens block.

BACKGROUND

Optical fibers have displaced copper-based connectivity in much of the traditional long-haul and metro telecommunication networks for numerous reasons such as large bandwidth capacity, dielectric characteristics and the like. As consumers require more bandwidth for consumer electronic devices such as smart phones, laptops, tablets and the like optical fibers and optical ports for optical signal transmission are being considered for replacing the conventional copper-based connectivity for these applications. However, there are significant challenges for providing optical connectivity in consumer devices compared with copper-based connectivity. By way of example, devices such as smart phones, laptops and tablets are exposed to rough handling and harsh environments and the consumer will expect optical connectivity to handle these demanding conditions. Further, these types of devices will require a large number of mating/unmating cycles during their lifetime.

Thus, there is an unresolved need for optical ports in consumer devices and other devices that can accommodate the harsh treatment and user environment along with the large number of mating/unmating cycles expected during the lifetime of the device.

SUMMARY

The disclosure is directed to a lens block for an optical connection such as an optical plug or an optical receptacle, but the lens block may be used in other applications. In one embodiment, the lens block includes at least one optical channel having an optical interface portion, a total internal reflection (TIR) surface for turning the optical signal of the at least one optical channel, at least one fiber lead-in aligned to the TIR surface, and one or more magnetic materials attached to the lens block. In one embodiment, the lens block may include one or more opening for receiving the one or more magnetic materials if desired.

The disclosure is also directed to other configurations of lens blocks. In another embodiment the lens block includes at least one optical channel having an optical interface portion on a first side, and one or more openings on a second side for receiving one or more magnetic materials. Lens blocks disclosed may be used for aligning and providing optical communication with one or more active components. The one or more active components may be electrically attached to a circuit board or the like.

The magnetic materials may be attached to the lens block in any suitable arrangement or manner. If desired, the lens block may include one or more openings for receiving and securing one or magnetic materials. The one or more openings may be located on any suitable side of the lens block as desired. The magnetic materials provide attachment with a complimentary device having an optical interface. Consequently, the lens block allows for quick and easy assembly. Further, the lens block provides a robust structure for a large number of mating/unmating cycles. In other embodiments, the lens blocks disclosed may further include one or more electrical contacts for making a hybrid connection.

The disclosure is also directed to method for making a lens block. One explanatory method of making a lens block includes the steps of providing a lens block having at least one optical channel with an optical interface portion, providing at least one magnetic material, and attaching the at least one magnetic material to the lens block. Other methods may optionally include providing a lens block with at least one opening on a side of the lens block. The method may also optionally include the step of providing a lens block that includes one or more alignment features. Additionally, the method may also optionally further include the step of attaching one or more electrical contacts to the lens block.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

DETAILED DESCRIPTION

Figure 1:
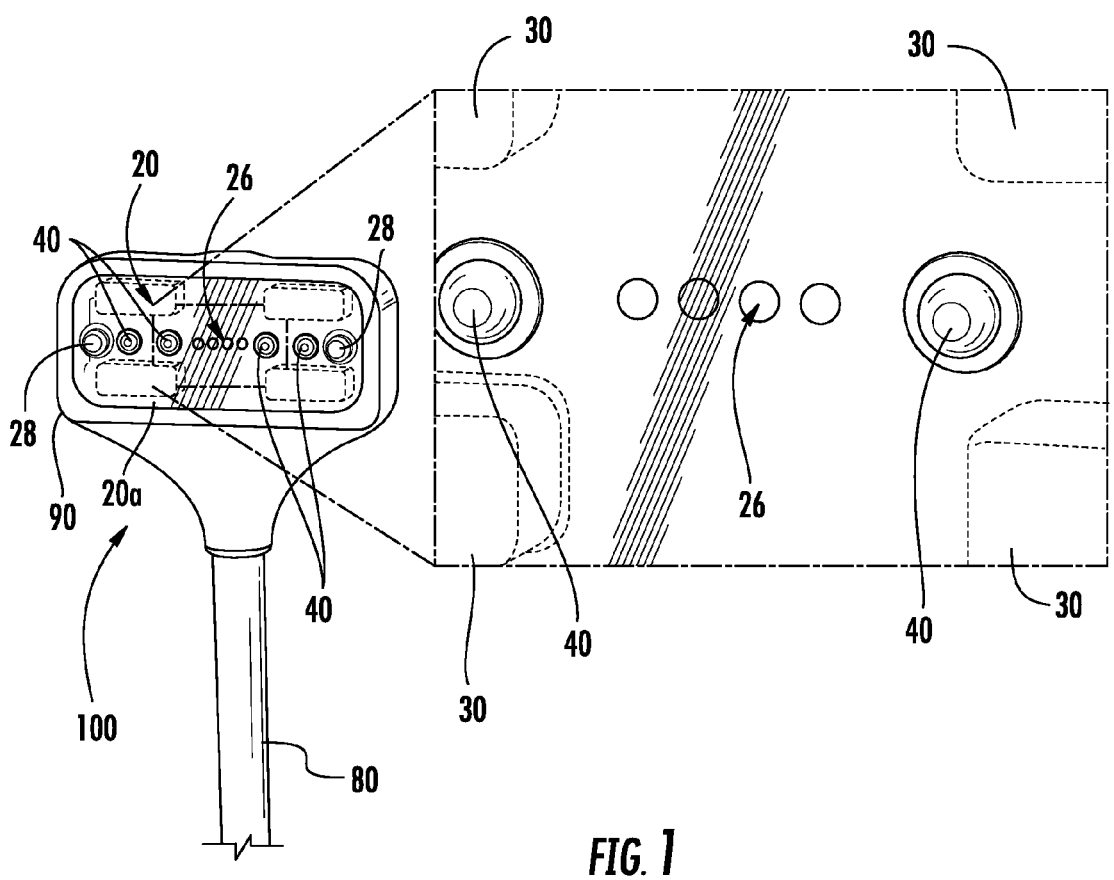
FIG. 1 is a perspective detailed view of a cable assembly having an optical plug for making an optical connection according to the concepts disclosed herein.

Reference will now be made in detail to the embodiments of the disclosure, examples of which are illustrated in the accompanying drawings. Whenever possible, like reference numbers will be used to refer to like components or parts.

The lens blocks disclosed herein enable high-speed data applications for transmitting optical signals to and from electronic devices. Further, the lens blocks enable optical connections may have a relatively small and compact footprints so that they are useful for use with connectors on cable assemblies, optical ports on electronic devices such as consumer devices, as well as other suitable applications. The lens blocks include at least one optical channel having an optical interface portion so it can receive and/or transmit optical signals and may optionally include one or more openings for receiving a magnetic magnetic material. As used herein, "magnetic material" means a magnetic material or a ferrous material that is attracted to a magnet material. The magnetic material allows for quick and easy mating of the optical connection along with a robust and compact footprint for applications expecting a large number of mating/unmating cycles. By way of example, a first side of an optical connection may use a first magnet and a second side of the optical connection may use a second magnet of opposite polarity for making an attachment between the first and second sides of the optical connection; alternatively, a first side of an optical connection may use a first magnet and a second side of the optical connection may use a ferrous material for making an attachment between the first and second sides of the optical connection.

As described herein, the optical signals may be converted into electrical signals and vice versa for transmitting signals to and from a complimentary electronic device that is optically connected to a cable assembly or the like. In order to transmit/receive optical signals, the lens block may have an optical channel that directs the optical signals to the desired location using a total internal reflection (TIR) surface or the lens block may have an in-line optical channel as desired for the application. For instance, the lens block of a cable assembly may include a TIR surface for turning the optical signal(s) of the respective optical channels and the lens block of the complimentary optical port on the electronic device may include the in-line optical channel(s) for directing the optical signal(s) to one or more active components on a circuit board, but other arrangements are possible. Further, lens blocks may include one or more lenses as desired. If used, the one or more lenses of the lens block are used for collimating or focusing the optical signal. By way of further explanation and not limitation, the transmission optical channel of the lens block of an electronic device is optically coupled to a laser such as a vertical-cavity surface-emitting laser (VCSEL) or laser diode of the electronic device, which is in further optical communication with an optical fiber in a complementary cable assembly by way of a complimentary cable assembly lens block, and from the optical fiber to the lens block of the complementary cable assembly to a receive optical channel of the optical port of an electronic device that is optically coupled to an active element such as a photodiode or the like. In other embodiments, the lens block may optionally include one or more attachment features for securing the lens block to the electronic device. In certain embodiments, the optical connections may have a footprint with a width that is greater than the height for use with relatively thin devices; however, other configurations are possible using the concepts disclosed. Stated another way, the concepts disclosed provide plug and play connectivity with a footprint that is advantageous for use with electronic devices having thin and compact profiles and the like.

Figure 2:
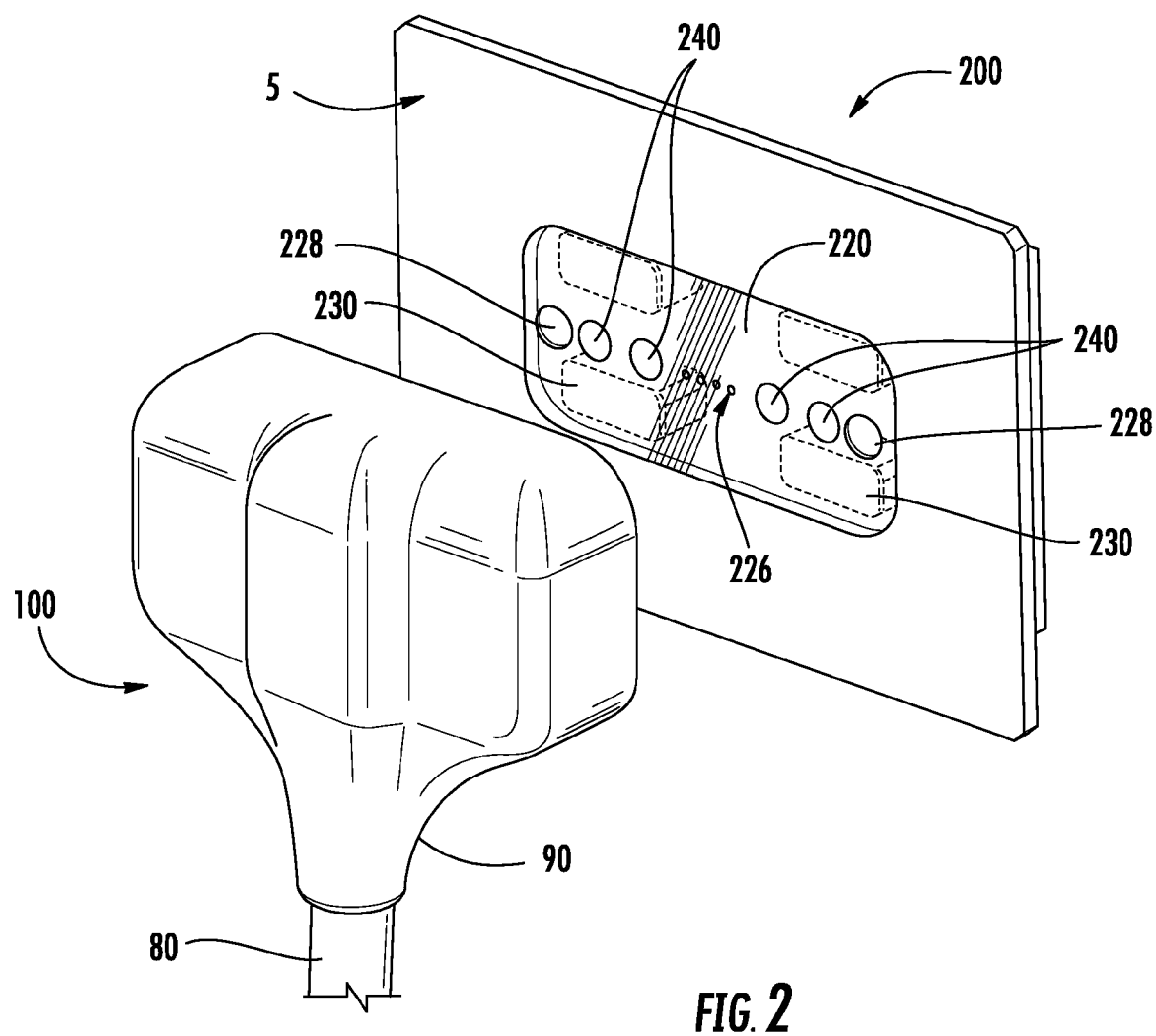
FIG. 2 is a perspective view showing the cable assembly of FIG. 1 being aligned with a complimentary electronic device having a receptacle with a lens block using the concepts disclosed herein.
Figure 7:
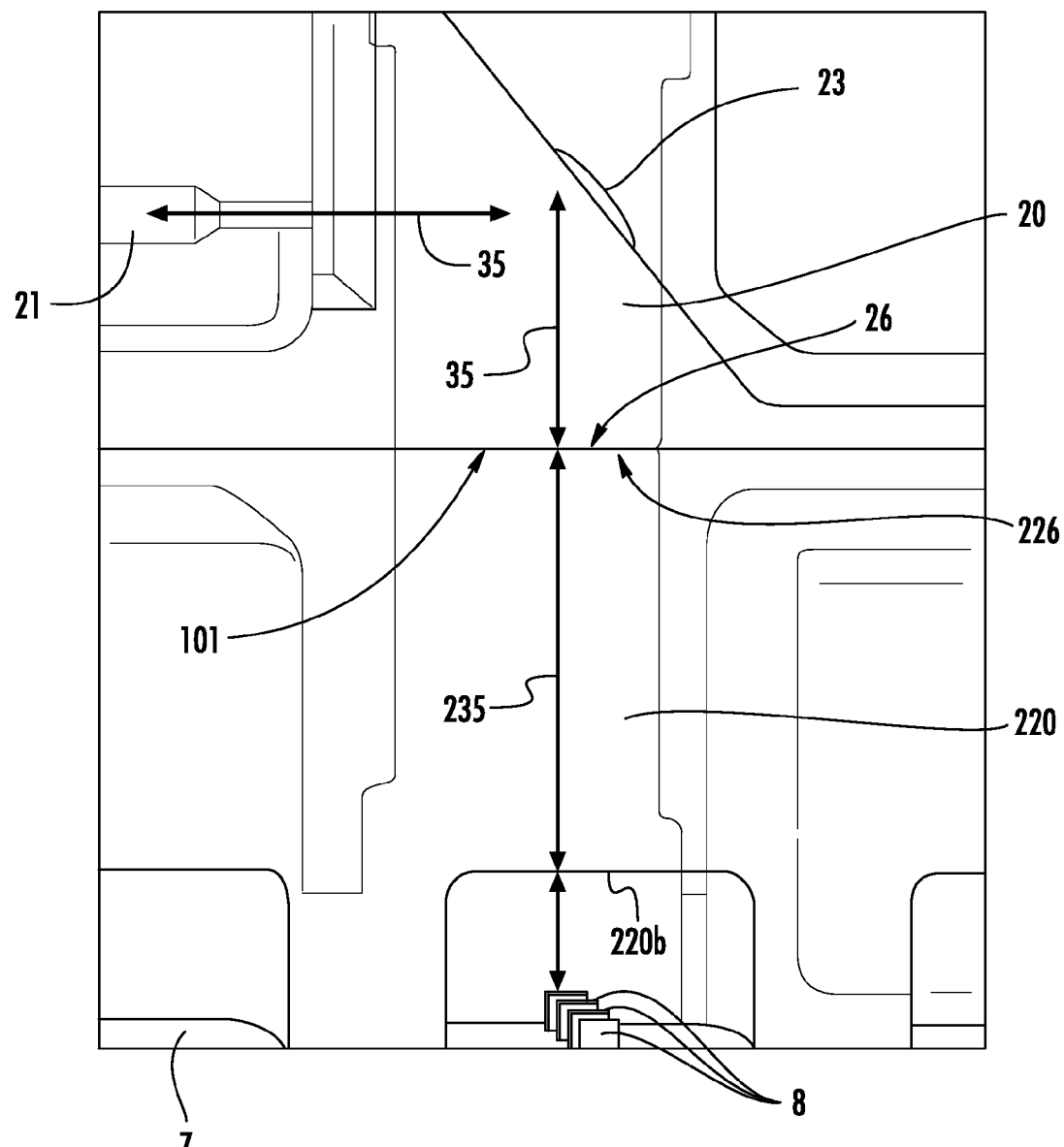
FIG. 7 is an expanded cross-sectional view of the optical path represented by the arrows for the optical channel defined by the mating between the lens block of the optical plug and the lens block of the complimentary electronic device.

FIG. 1 is a perspective detailed view of a cable assembly 100 that is used for making an optical connection with a complementary device according the concepts disclosed herein. Cable assembly 100 includes an optical plug 90 attached to a cable 80 having at least one optical fiber. Optical plug 90 includes a lens block 20 for making the optical connection and is a portion of cable assembly 100. Specifically, the at least one optical fiber of the cable 80 is in optical communication with the lens block 20 of optical plug 90. FIG. 2 is a perspective view showing the cable assembly 100 being aligned with a complimentary electronic device 5 having an optical port 200 with a complimentary lens block 220. When the optical plug 90 of cable assembly 100 is attached to the optical port 200 of electronic device 5 an optical connection is enabled between lens block 20 of the optical plug 90 and lens block 220 of optical port 200 for optical communication at a mating interface 101 (FIG. 7).

Figure 3:
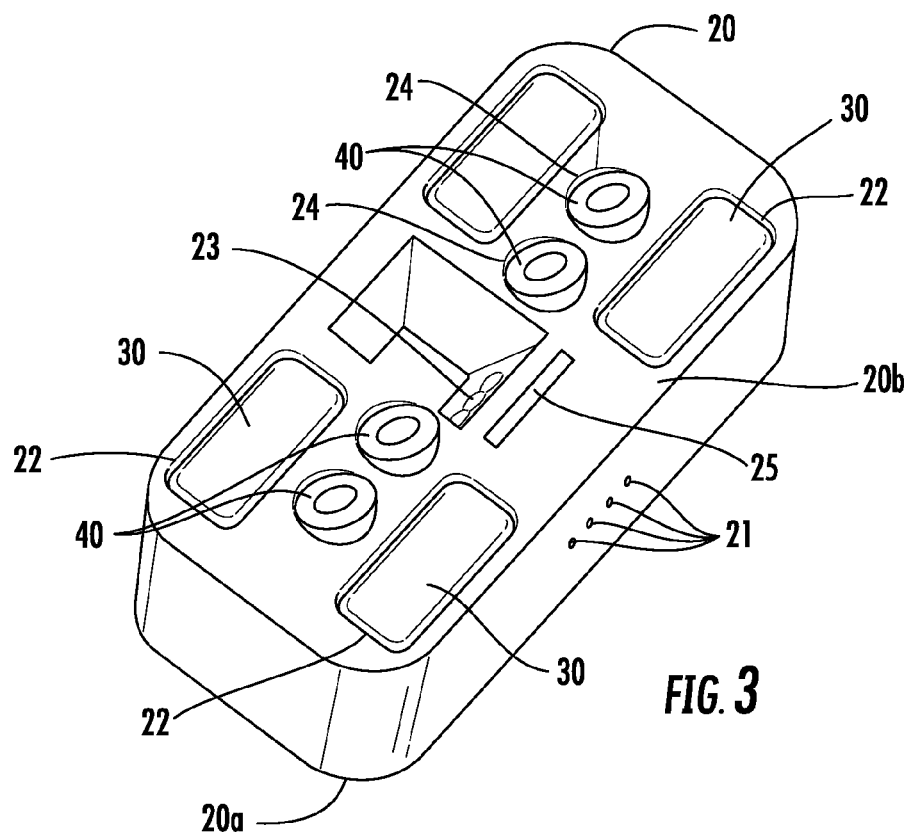
FIG. 3 is a bottom perspective view of a lens block of the optical plug of FIG. 1 showing representative details of the construction.

With reference to FIG. 1, lens block 20 includes at least one optical channel 35 (FIG. 7) having an optical interface portion 26 disposed on a first side 20a and FIG. 3 is a bottom perspective view of lens block 20. In this embodiment, lens block 20 is formed from a suitable material such as LEXAN that allows the transmission of optical signals therethrough at the desired wavelength. Lens block 20 includes four optical channels, but the lens block 20 may include any suitable number of optical channels in any suitable arrangement or array as desired. In this configuration, lens block 20 includes a total internal reflection (TIR) surface 23 for turning the optical signal of the at least one optical channel 26. The TIR surface 23 is formed by the different refractive indexes between the material of the lens block 20 and the air interface causing the optical signals to reflect and turn back into the lens block and continue along their optical path. Stated another way, the material/air interface cause the optical signal to turn within the lens block 20. Consequently, the TIR surface 23 can change the direction of travel for (e.g., turning) the optical signal(s). By way of example, the TIR surface 23 changes the direction of the optical channel 35 from the direction aligned with the fiber lead-in 21 to a direction that is generally perpendicular to the fiber lead-in 21. Lens block 20 also includes at least one fiber lead-in 21 aligned to the TIR surface 23. The fiber lead-in 21 is used for receiving an optical fiber of cable 80 and aligning the fiber with the respective optical channel of the lens block 20. As shown in FIG. 3, lens block 20 may optionally include a well 25 that opens to the at least one fiber lead-in 21. The well 25 is located at a position where it may receive a suitable adhesive for securing the one or more optical fibers of the cable 80 to the lens block 20. Further, the well 25 may be arranged so that is open to multiple fiber lead-ins 21 and may receive the adhesive for securing all of the optical fibers to the lens block 20. Lens blocks may also optionally include one or more lenses (not numbered) as part of the optical channel of the lens block as desired. The one or more lenses (not numbered) may be arrange at any suitable location on the lens block 20 such as at the TIR surface 23, but other suitable locations are possible.

In this embodiment, lens block 20 also includes one or more openings 22 for receiving one or more magnetic materials 30 as best shown in FIG. 3. Openings 22 may have any suitable shape and/or size for receiving a respectively sized magnetic material 30. The one or more openings 22 may be disposed on any suitable side of the lens block 20 such as the same side as the optical interface portion 26, a side adjacent to the optical interface portion 26 (e.g., a short side), or a side opposite to the optical interface portion 26 as desired. In other embodiments, the magnetic materials 30 may be attached to an outer side or periphery of the lens block 20. In this embodiment, the one or more openings 22 are disposed on a second side 20b of the lens block 20. The second side 20b being different than the first side 20a of the lens block 20. More specifically, lens block 20 has the first side 20a located on an opposite side from the second side 20b. Thus, the magnetic materials 30 may be inserted into the respective openings 22 from rear and secured in place.

As discussed herein, each of the magnetic materials 30 of lens blocks 20,220 are selected as a (1) magnet; or (2) a ferrous material that is attracted to a magnet so as to cooperate with a complimentary magnetic material disposed in the lens block 220 of a complimentary device to provide a magnetic attractive force therebetween. Stated another way, the magnetic attractive force between the lens block 20 and lens block 220 holds the optical connection therebetween when mated and may be overcome with sufficient force for unmating the optical connection when desired. By way of example, the magnetic materials may be magnets with the desired pole, ferrous material that is attracted to a magnet, or combinations of magnets and ferrous materials. Magnetic materials may be secured with a friction fit, a mechanical fit, or an adhesive or the like as desired. Moreover, the openings 22 need not extend to the first side 20a so that the first side 20a of lens block 20 may have a generally flush surface at the first side 20a about the magnetic material 30; however, the opening could extend to the first side 20a if desired. Consequently, the first side 20a (i.e., the mating surface) may have a smooth appearance about the magnetic material locations for aesthetics and/or inhibiting adhesive from reaching the first side 20a of lens block 20 having the optical interface portion 26.

The lens block 20 may have any suitable number of openings 22 arranged in any suitable pattern. In this particular embodiment, the one or more openings 22 of lens block 20 are four openings quadrilaterally arranged on the second side 20b; however, other arrangements are possible. By way of example, the lens block could have two openings disposed on opposite sides of the optical interface portion 26 if desired. When lens block 20 of plug 90 is mated to the optical port 200 as shown in FIG. 2, the magnetic materials 30 of the lens block 20 are attracted to complimentary magnetic materials 230 of lens block 220 of a complimentary electronic device 5. Additionally, the lens block 20 may further optionally include one or more alignment features 28 on the first side 20a. The respective alignment features may engage and provide optical alignment of the respective optical interface portions 28, 228 of the plug 90 and the optical port 200 along with alignment of the respective magnetic materials 30, 230. By way of example, the respective alignment features may be alignment pins and alignment bores; however, other suitable alignment features are possible such as protrusions, castellations, or the like disposed at or near the corners of the lens block and may be disposed only on the plug-side if desired. As depicted, the one or more alignment features 28 of lens block 20 are alignment pins. In this embodiment, alignment pins are integrally molded with lens block 20, but they could be separate components if desired. Alignment pins of lens block 20 cooperate with the suitable alignment features 228 of the lens block 220 such as alignment bores.

The lens blocks 20, 220 may have solely an optical interface or optionally have a hybrid optical and electrical interface if desired. Illustratively, lens block 20 further includes one or more bores 24 adjacent to the optical interface portion 26 for receiving one or more electrical contacts 40. In lens block 20 and lens block 220, the bores 24 are located at outboard sides of the optical interface portions 26 and 226 and are arranged to provide physical contact between respective electrical contacts when mated together. In this case, lens block 20 includes four bores 24 with two bores on each side of the optical interface portion 26, but any suitable number of bores is possible. Lens blocks may use any suitable type of electrical contacts as desired. By way of example, lens block 20 has one or more pogo pin electrical contacts disposed in the one or more bores 24. The electrical contacts may be used for power and/or data transmission as desired. The electrical contacts are electrically connected to electrical conductors of cable 80 for the cable assembly 100 or electrically connected to the circuit board of the electronic device for the optical port.

Figure 4:
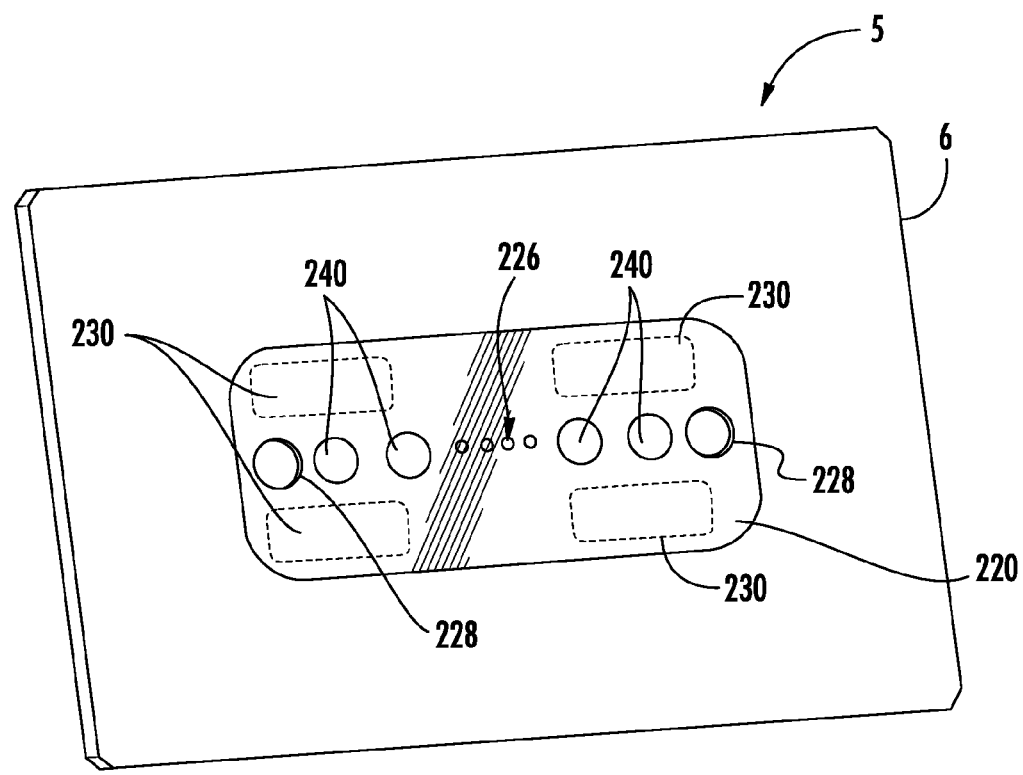
FIG. 4 is a front perspective view of the lens block of the complimentary electronic device of FIG. 2.
Figure 5:
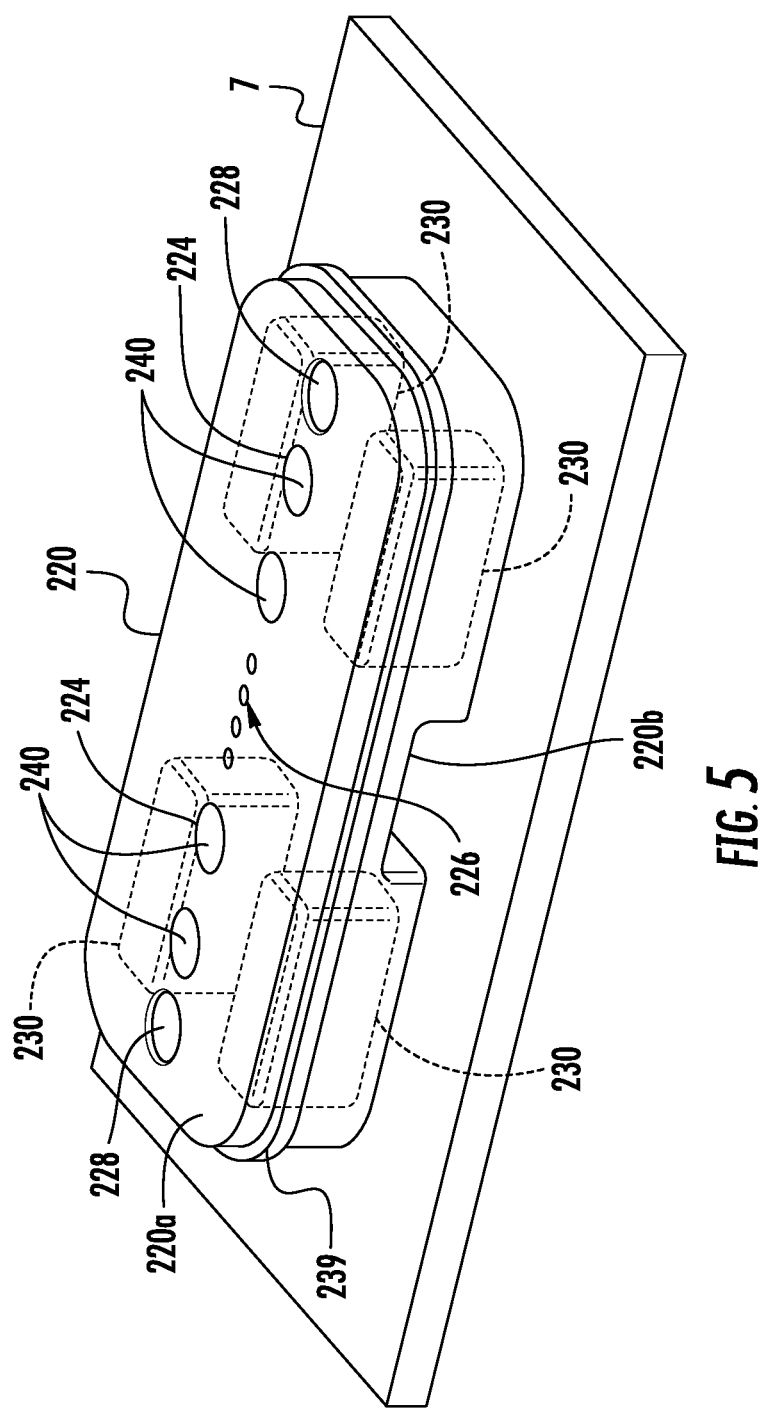
FIG. 5 is a perspective view of the lens block of the complimentary electronic device disposed on a circuit board having at least one optical channel aligned with an active component disposed on the circuit board.
Figure 6:
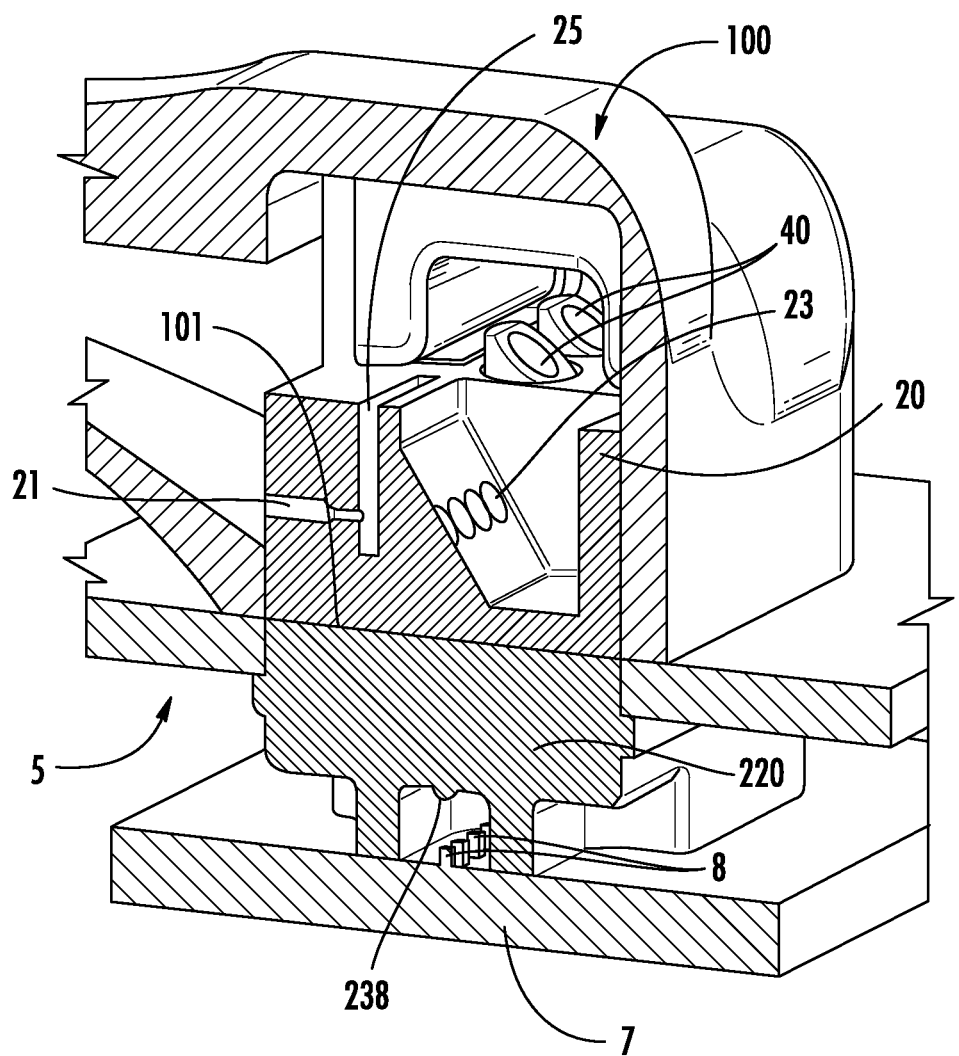
FIG. 6 is a detailed cross-sectional view of the optical plug of the cable assembly of FIG. 1 mated to the lens block of the complimentary electronic device of FIG. 2.

FIG. 4 is a front perspective view of the lens block 220 of the complementary electronic device 5 and FIG. 5 is a perspective view of the lens block 220 disposed on a circuit board 7. Lens block 220 is similar to lens block 20, but it does not include the TIR surface, and does not include a fiber lead-in and well; instead, lens block 220 provides optical communication with one or more active components 8 (FIGS. 6 and 7). As discussed, lens block 220 cooperates with lens block 20 for providing an optical connection at the mating interface 101 between the lens blocks when coupled (e.g., mated) together. Lens block 220 has at least one optical channel 235 (FIG. 7) having an optical interface portion 226 on a first side 220a and one or more openings 224 on a second side 220b for receiving one or more magnet materials 230.

As shown, lens block 220 may be arranged so that it is generally flush with a faceplate 6 of the electronic device, but other arrangements are possible. For instance, lens block 220 may include a retaining feature 239 such as a flange for positioning the lens block 220 relative to the faceplate 6, thereby inhibiting forces from disturbing the lens block alignment with the active components 8 on the circuit board 7 of the electronic device 5. When assembled and installed, the lens block 220 is a portion of the electronic device 5.

In this embodiment, lens block 220 has one or more in-line optical channels 235 (FIG. 7). having at least one optical channel aligned with an active component 8 disposed on the circuit board 7. On the transmit channels active components 8 such as VCSELs or laser diodes transmit optical signals to lens block 220 and on receive channels active components 8 such as photodiodes receive optical signals from lens block 220. However, other embodiment may have all transmit or all receive channels if desired. Although, lens block 220 is shown having in-line optical channels, other embodiments of the lens block that is in communication with active components may include a TIR surface for turning the optical signals(s) of the optical channels as desired.

Lens block 220 is formed from a suitable material such as LEXAN that allows the transmission of optical signals therethrough at the desired wavelength. Like complimentary lens block 20, lens block 220 includes four optical channels, but the lens block 220 may include any suitable number of optical channels in any suitable arrangement or array as desired, and is typically matched to the complementary lens block for optical communication. Lens block 220 may also optionally include one or more lenses 238 as part of the optical channel of the lens block as desired. The one or more lenses 238 may be arrange at any suitable location on the lens block 220 such as at the second side 220*b* and in-line with the active components 8, but other suitable locations are possible.

Lens block 220 may also optionally include one or more openings 222 for receiving one or more magnetic materials 230 as best shown in FIG. 5. As with lens block 20, openings 222 of lens block 220 may have any suitable shape and/or size for receiving a respectively sized magnetic material 230. The one or more openings 222 may be disposed on any suitable side of the lens block 220 such as the same side as the optical interface portion 226, a side adjacent to the optical interface portion 226 (e.g., a short side), or a side opposite to the optical interface portion 226 as desired. In this embodiment, the one or more openings 222 are disposed on a second side 220*b* of the lens block 220 with the second side 220*b* being different than the first side 220*a* of the lens block 220. More specifically, lens block 220 has the first side 220*a* located on an opposite side from the second side 220*b*. Thus, the magnetic materials 230 may be inserted into the respective openings 222 from the second side 220*b*. Moreover, since the magnetic materials 30,230 are not exposed at the first side 20*a*,220*a* of respective lens blocks 20,220 the magnetic materials 30,230 may be protected from environmental effects such as inhibiting corrosion and allows easier cleaning of the respective first sides. In this particular embodiment, the one or more openings 222 of lens block 220 are four openings quadrilaterally arranged on the second side 220*b* to cooperate with lens block 20; however, other arrangements are possible. Further, the lens blocks may include one or more coatings such as anti-reflection or anti-scratch coatings if desired.

As discussed, the respective alignment features may engage and provide optical alignment of the respective optical interface portions 28, 228 of the plug 90 and the optical port 200 along with alignment of the respective magnetic materials 30,230. Alignment features 28 of lens block 20 cooperate with the alignment features 228 of the lens block 220. In this embodiment, the respective alignment features of lens block 20 are alignment pins that are sized for the alignment bores formed in lens block 220. Other shapes of protruding alignment features are possible instead of round such as square, crosses, etc.

FIG. 6 is a detailed cross-sectional view of the optical plug 90 of the cable assembly 100 mated to the lens block 220 of the complimentary electronic device 5 showing details. FIG. 7 is an expanded cross-sectional view of the optical path represented by the arrows for the optical channel(s) defined by the mating between the lens block 20 and the lens block 220. As shown, lens block 20 has an optical channel 35 that is generally aligned with the fiber lead-in 21 and turns at the TIR surface 23 so that it is generally perpendicular with the fiber lead-in 21 toward the optical interface 26. The optical signal may transition past the mating interface 101 and toward the optical interface 226 of lens block 220. The optical channel 235 is generally in-line and aligned with the desired active component 8 disposed on the circuit board 7. Each respective optical channel 235 may include lens 238 where the optical signal exit/enters the lens block 220 at second side 220*b* for collimating the optical signal if desired.

Figure 8:
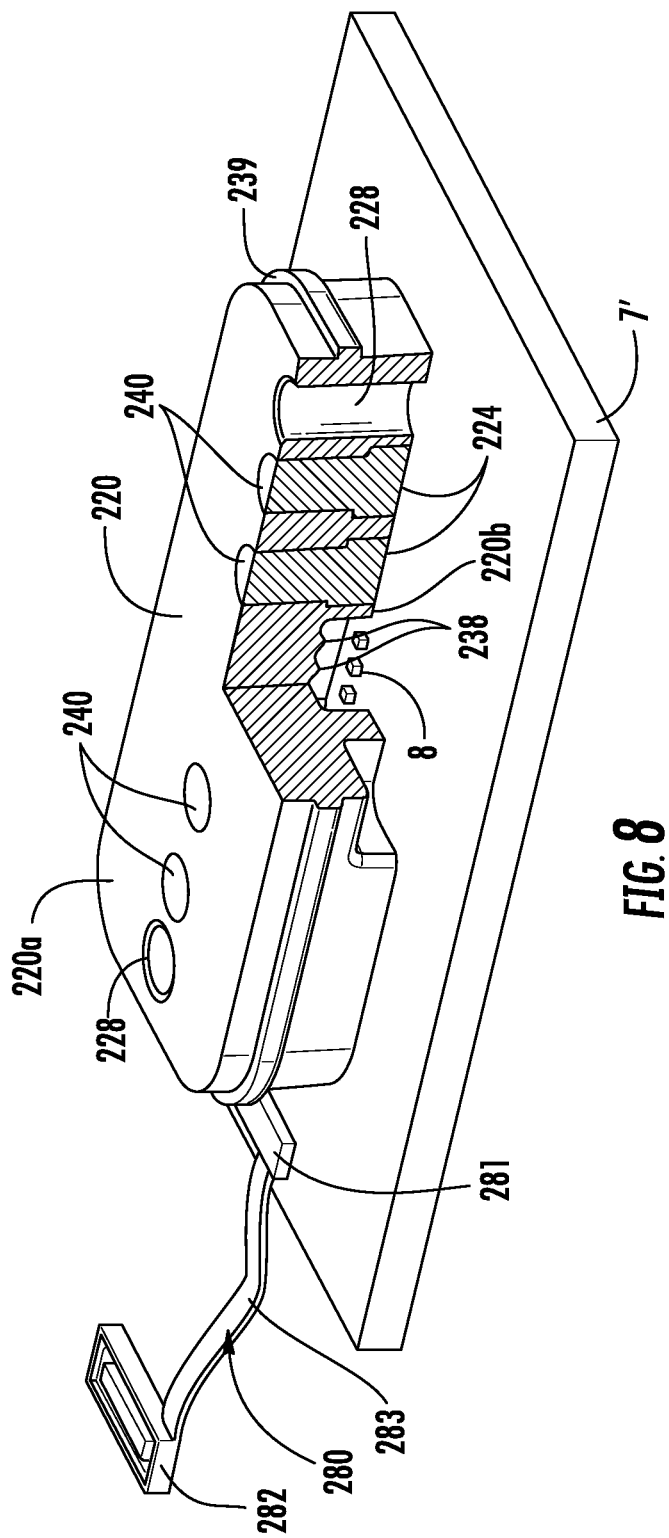
FIG. 8 is a partial cross-sectional view of a variation of a lens block assembly for a complimentary electronic device.

FIG. 8 is a partial cross-sectional view of a variation of a lens block assembly using lens block 220. The lens block assembly is configured as a module with an electrical lead 280 and one or more electrical connectors so that it may be used as a daughter board having circuit board 7'. When configured as daughter board, the electrical lead 280 allows electrical connection to another circuit board or electrical device and allows modular assembly and/or replacement as desired. Circuit board 7' is electrically attached to electrical lead 280 in a suitable manner. For instance, electrical lead 280 may include one or more electrical connectors. As shown in this embodiment, electrical lead 280 includes a first electrical connector 281 for attaching to circuit board 7' and a second electrical connector 282 for attaching to another circuit board or the like. However, other embodiments may have the electrical lead 280 soldered to the circuit board 7'; instead, of using the electrical connector.

Figure 9:
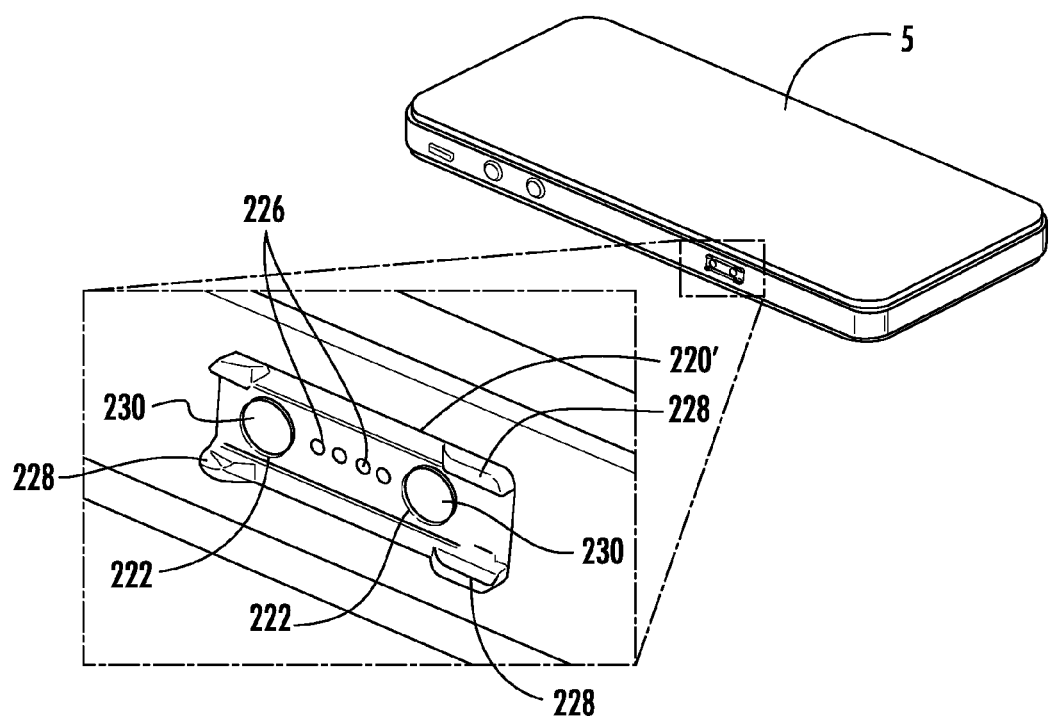
FIG. 9 is a perspective view showing another alternative embodiment of the lens block for an optical port on a complimentary electronic device.

FIG. 9 is a perspective view showing another alternative embodiment for a lens block 220' used as an optical port for a complimentary electronic device 5. Lens block 220' operates similar to lens block 220 since it provides optical communication with one or more active components 8 on a circuit board 7, but it includes one or more lenses arranged at the optical interface 226. As before, lens block 220 cooperates with complimentary lens block for providing an optical connection at the mating interface when coupled (e.g., mated) together. Lens block 220' has at least one optical channel having an optical interface portion 226 on a first side 220*a*. In this embodiment, the lenses are located at the optical interface 226 and are discrete components that inserted into respective bores of lens block 220' as part of the optical channel. Specifically, the lenses are GRIN lenses disposed as a portion of the optical channel in the lens block. The lens block 220' also includes one or more openings 222 that extend from to the first side 220*a* for receiving one or more magnet materials 230. Thus, the magnetic materials 230 are exposed at the first side 220*a*. However, this arrangement may allow the attraction of metallic trash on a magnet. As shown, lens block 220 may be arranged so that it is generally flush with a faceplate of the electronic device, but the respective alignment features 228 slightly protrude and are configured as protrusions such as castellations or the like disposed at or near the corners of the lens block 220'. When assembled and installed, the lens block 220' is a portion of the electronic device 5.

In this embodiment, lens block 220' may be formed from a suitable opaque material since it does not have to allow the transmission of optical signals therethrough at the desired wavelength; instead, the GRIN lenses transmit the optical signal and are in optical communication with active components in-line with the GRIN lenses. Lens block 220' includes four optical channels, but the lens block 220' may include any suitable number of optical channels in any suitable arrangement or array as desired.

Figure 10:
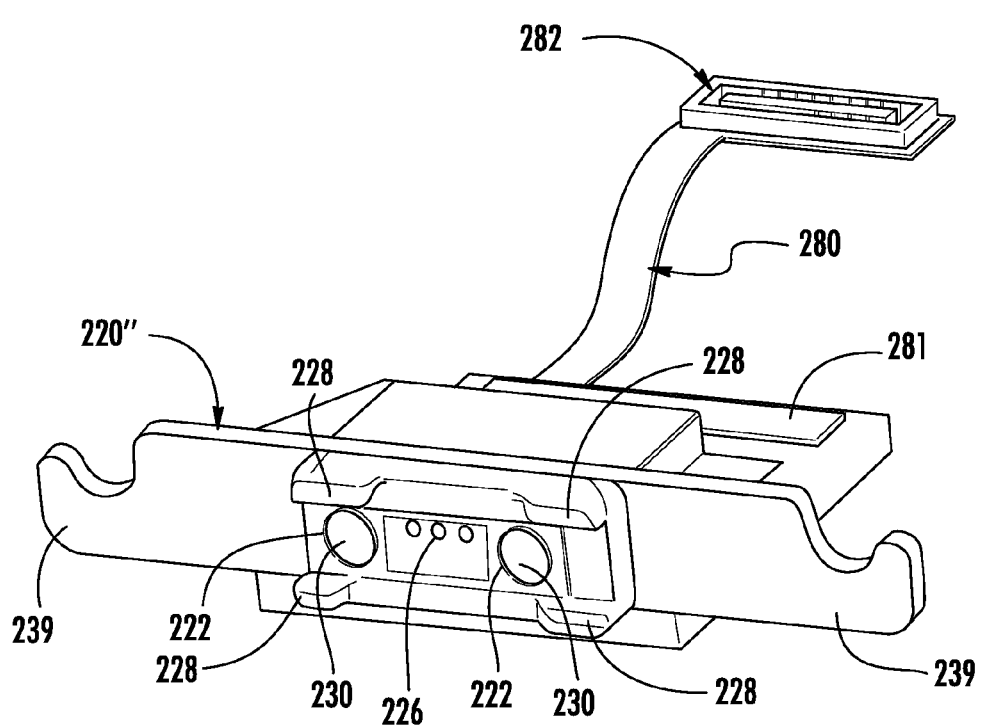
FIGS. 10 and 11 respectively are front and rear perspective views of still another lens block for an optical port on a complimentary electronic device.
Figure 11:
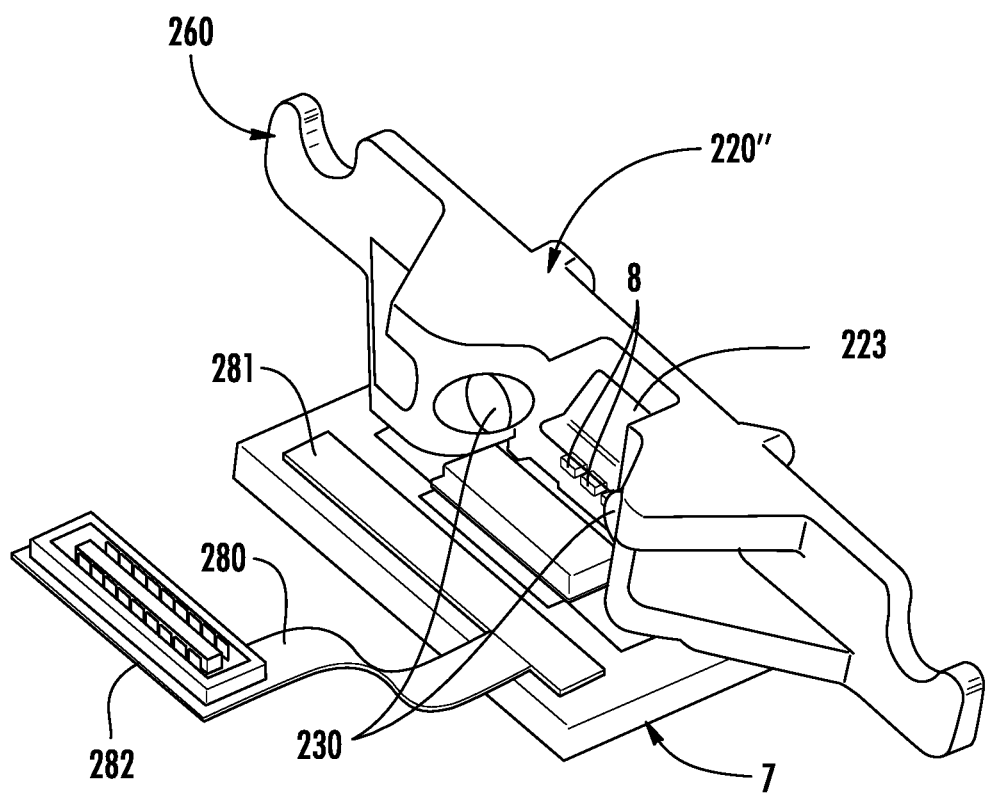

FIGS. 10 and 11 respectively are front and rear perspective views of still another lens block 220". Lens block 220" operates similar to lens block 220 since it provides optical communication with one or more active components 8 on a circuit board 7, but it includes a TIR surface 223 for turning the optical signals to the active components 8 on a circuit board 7. As before, lens block 220" cooperates with complimentary lens block for providing an optical connection at the mating interface when coupled (e.g., mated) together. Lens block 220" has at least one optical channel having an optical interface portion 226 on a first side 220*a* and one or more openings 222 on a first side 220*a* for receiving one or more magnet materials 230. In this embodiment, the optical interface portion 226 has a cover (not numbered) that is attached to the lens block 220" and lenses that are integrally molded into the lens block 220". Cover may be any suitable materials such as a polymer or glass composition that allows the transmission of optical signals therethrough. Moreover, cover may include any suitable coating(s) as desired.

Lens block 220" may be arranged so that it is generally flush with a faceplate of the electronic device, but the respective alignment features 228 slightly protrude and are configured as protrusions such as castellations or the like disposed at or near the corners of the lens block 220". Further, lens block 220" includes a retaining features 239 such as a flanges for positioning and securing the lens block 220" relative to the faceplate 6, thereby inhibiting forces from disturbing the lens block alignment with the active components 8 on the circuit board 7 of the electronic device 5.

Lens block 220" is formed from a suitable material such as LEXAN that allows the transmission of optical signals therethrough at the desired wavelength. Lens block 220" may include any suitable number of optical channels in any suitable arrangement or array as desired, and is typically matched to the complementary lens block for optical communication. The lens block 220' also includes one or more openings 222 that extend from to the first side 220a for receiving one or more magnet materials 230. Thus, the magnetic materials 230 are exposed at the first side 220a.

The lens block assembly also includes an electrical lead 280 and one or more electrical connectors so that it may be used as a daughter board having circuit board 7. When configured as daughter board, the electrical lead 280 allows electrical connection to another circuit board or electrical device and allows modular assembly and/or replacement as desired. Circuit board 7 is electrically attached to electrical lead 280 in a suitable manner. For instance, electrical lead 280 may include one or more electrical connectors. As shown in this embodiment, electrical lead 280 includes a first electrical connector 281 for attaching to circuit board 7 and a second electrical connector 282 for attaching to another circuit board or the like. However, other embodiments may have the electrical lead 280 soldered to the circuit board 7; instead, of using the electrical connector. When assembled and installed, the lens block 220" is a portion of the electronic device 5.

The disclosure is also directed to method for making a lens block. One explanatory method of making a lens block includes the steps of providing a lens block having at least one optical channel with an optical interface portion and at least one opening on a side of the lens block, providing at least one magnetic material, and attaching the at least one magnetic material to the at least one opening of the lens block. The method may also optionally include the step of providing a lens block that includes one or more alignment features. Additionally, the method may also optionally further include the step of attaching one or more electrical contacts to the lens block.

Although the disclosure has been illustrated and described herein with reference to embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the concepts disclosed without departing from the spirit and scope of the same. Thus, it is intended that the present application cover the modifications and variations provided they come within the scope of the appended claims and their equivalents.

We claim:

1. A lens block for an optical connection, comprising:
   at least one optical channel having an optical interface portion positioned at a first side of the lens block, wherein the lens block is fabricated from an optically transmissive material;
   a total internal reflection (TIR) surface for turning an optical signal of the at least one optical channel;
   at least one fiber lead-in positioned at an outer side of the lens block and aligned to the TIR surface; and
   one or more magnetic materials positioned within one or more openings in a second side of the lens block, wherein the second side is different from the first side, and the one or more openings extend into the lens block from the second side the lens block.

2. The lens block of claim 1, further including one or more bores adjacent to the optical interface portion for receiving one or more electrical contacts.

3. The lens block of claim 2, further including one or more pogo pin electrical contacts in the one or more bores.

4. The lens block of claim 1, further including a lens for the at least one optical channel.

5. The lens block of claim 1, further including one or more alignment features on the first side of the lens block.

6. The lens block of claim 5, wherein the one or more alignment features are alignment pins.

7. The lens block of claim 1, further including a well that opens to the at least one fiber lead-in.

8. The lens block of claim 1, wherein the first side is located on an opposite side from the second side.

9. The lens block of claim 1, said lens block being a portion of a cable assembly.

10. A lens block, comprising:
    at least one optical channel having an optical interface portion positioned at a first side of the lens block, wherein the lens block is fabricated from an optically transmissive material; and
    one or more magnetic materials positioned within one or more openings in a second side of the lens block, wherein the second side is different from the first side, and the one or more openings extend into the lens block from the second side of the lens block.

11. The lens block of claim 10, further including one or more bores adjacent to the optical interface portion for receiving one or more electrical contacts.

12. The lens block of claim 11, further including one or more pogo pin electrical contacts in the one or more bores.

13. The lens block of claim 10, further including a lens for the at least one optical channel.

14. The lens block of claim 10, wherein the one or more openings are four openings quadrilaterally arranged on the second side.

15. The lens block of claim 10, further including one or more alignment features on the first side.

16. The lens block of claim 15, wherein the one or more alignment features are alignment bores or alignment pins.

17. The lens block of claim 10, said lens block being aligned to one or more active components disposed on a circuit board.

18. The lens block of claim 10, said lens block being a portion of an electronic device.

19. A method for making a lens block, comprising:
    providing the lens block comprising at least one optical channel with an optical interface portion on a first side of the lens block and a total internal reflection (TIR) surface for turning an optical signal of the at least one optical channel, and at least one fiber lead-in positioned at an outer side of the lens block and aligned with the TIR surface, wherein the lens block is fabricated from an optically transmissive material;

providing at least one magnetic material; and attaching the at least one magnetic material to the lens block at a second side of the lens block, wherein the second side is different from the first side.

20. The method of claim 19, wherein the lens block includes one or more alignment features.

21. The method of claim 19, further including the step of attaching one or more electrical contacts to the lens block.

22. The lens block of claim 1, wherein the one or more openings do not extend to the first side so that the first side of the lens block has a generally flush surface at the first side about the magnetic material.

23. The lens block of claim 10, wherein the one or more openings do not extend to the first side so that the first side of the lens block has a generally flush surface at the first side about the magnetic material.

24. The method of claim 19, wherein the one or more openings do not extend to the first side so that the first side of the lens block has a generally flush surface at the first side about the magnetic material.

25. A cable assembly, comprising:

a cable having at least one optical fiber;

an optical plug coupled to the cable, the optical plug comprising a lens block fabricated from an optically transmissive material, wherein the lens block comprises:

at least one optical channel having an optical interface portion positioned at a first side of the lens block;

a total internal reflection (TIR) surface for turning an optical signal of the at least one optical channel; and at least one fiber lead-in aligned to the TIR surface, wherein the at least one fiber lead-in is positioned at an outer side of the lens block; and one or more magnetic materials attached to the lens block at a second side of the lens block, wherein the second side is different from the first side.

26. The cable assembly of claim 25, wherein the at least one optical fiber is optically coupled to the at least one fiber lead-in.

27. A lens block, comprising:

at least one optical channel having an optical interface portion on a first side of the lens block; and one or more magnetic materials positioned within one or more openings extending into a second side of the lens block, wherein the one or more openings do not extend to the first side so that the first side of the lens block has a generally flush surface at the first side about the one or more magnetic materials.

28. The lens block of claim 27, further including a lens for the at least one optical channel.

29. The lens block of claim 27, wherein the one or more openings are four openings quadrilaterally arranged on the second side.

\* \* \* \* \*